Dec. 2, 1969  G. WALTER  3,481,432
FLEXIBLE SAFETY GUIDE CLAMP
Filed Dec. 28, 1967  4 Sheets-Sheet 1

INVENTOR.
GEORGE WALTER
BY
Hopgood & Calimafde
ATTORNEYS

INVENTOR.
GEORGE WALTER
BY
Hopgood & Calimafde
ATTORNEYS

Dec. 2, 1969 G. WALTER 3,481,432
FLEXIBLE SAFETY GUIDE CLAMP
Filed Dec. 28, 1967 4 Sheets-Sheet 4

INVENTOR.
GEORGE WALTER
BY
Hopgood & Calimafde
ATTORNEYS

United States Patent Office 3,481,432
Patented Dec. 2, 1969

---

3,481,432
FLEXIBLE SAFETY GUIDE CLAMP
George Walter, Roslyn Heights, N.Y., assignor to Armor Elevator Co., Inc., Woodside, N.Y., a corporation of New York
Filed Dec. 28, 1967, Ser. No. 694,293
Int. Cl. B66b 5/16
U.S. Cl. 187—90  3 Claims

ABSTRACT OF THE DISCLOSURE

A high speed elevator braking mechanism utilizing dual flexible guide clamps to grip opposing guide rails upon which an elevator travels, in which a clamp actuating spring is compressed between the jaw levers of each clamp, and retained thereby bushing and flange fittings which provide for adjustment of the compression on the spring. A mechanical linkage actuated by a speed sensing governor wedges gibs between the jaws and the rails to effect the braking action.

BACKGROUND

The invention is in the field of safety stop devices for high speed elevators; and more particularly pertains to improvements in flexible guide safety clamps.

Elevator safeties fall into three general categories, (1) those that instantaneously apply unlimited braking force upon initiation, (2) those in which the braking force builds up gradually to a limited or unlimited force, and (3) those which instantaneously apply and maintain a constant preselected braking force. The invention is an improved flexible guide clamp which falls within category (3).

In general, a flexible guide clamp provides a spring loaded jaw disposed about the elevator guide rail to buttress wedge shaped brake shoes or gibs, which are wedged between the jaws and the rail to produce the braking force. The wedging of the gibs establishes braking contact with the rail, and the clamp linkage provides the required mechanical advantage to apply the desired braking force. The braking force applied is a function of this mechanical advantage and the displacement and strength of the spring resisting the spreading of the jaws.

Some prior art flexible guide clamps employ a scissor action linkage between the lever arms of the clamp, with the actuating spring mounted on the outside of the lever arms or jaws. This construction results in the spreading of the lever arms as the braking action is begun.

One problem associated with the use of such devices and others similar to it was the amount of space required to mount them. In view of the fact that the jaws of the clamp must be positioned on either side of a guide rail, the body of the clamp necessarily falls in the area of the safety planks supporting the cab. Since there is not enough room between the safety planks to accommodate the clamp with the spring mounted on the side, the whole clamp mechanism must be mounted below the safety planks resulting in extension of the cab and the addition of undesired weight.

Accordingly, it is a primary objective of the invention to reduce the space and weight requirements of the braking mechanism, and more specifically, to provide a flexible clamp safety which can be mounted entirely between the safety planks of the elevator cab.

It is a further objective of the invention to provide a braking mechanism which facilitates adjustment of the braking force to be applied upon actuation.

SUMMARY OF THE INVENTION

Briefly, the invention is a flexible elevator guide rail clamp in which the jaw levers are pivotally attached to a common fulcrum, so that the spreading of the jaws at the rail squeezes together the inboard ends of the jaw levers. Compression springs are mounted between the inboard lever ends substantially perpendicular to the safety planks to resist this squeezing action, and are supported at one end by a flange nut which provides a means to adjust the resistance of the springs to the squeezing effect of the jaw levers. The assembly is mounted between the safety planks of the elevator cab.

A principal advantage of the invention is that the inboard ends of the jaw levers do not expand upon actuation as in scissor action flexible clamps, but contract, permitting the actuating spring to be disposed between the levers; this results in the entire assembly being narrow enough to mount between the safety planks.

Other advantages of the invention are:
(a) Instantaneous application of the desired retarding force upon actuation,
(b) Adjustability of the retarding force to stop the elevator within the distance prescribed by safety codes,
(c) Constant retarding force, and
(d) Ease of release; the cab need only be lifted a few feet to disengage the brake.

Other objectives, advantages, and various further features of novelty and invention will be pointed out or will occur to those skilled in the art from a reading of the following specification in conjunction with the accompanying drawings.

DESCRIPTION OF THE PREFERRED EMBODIMENTS

Figure 1:
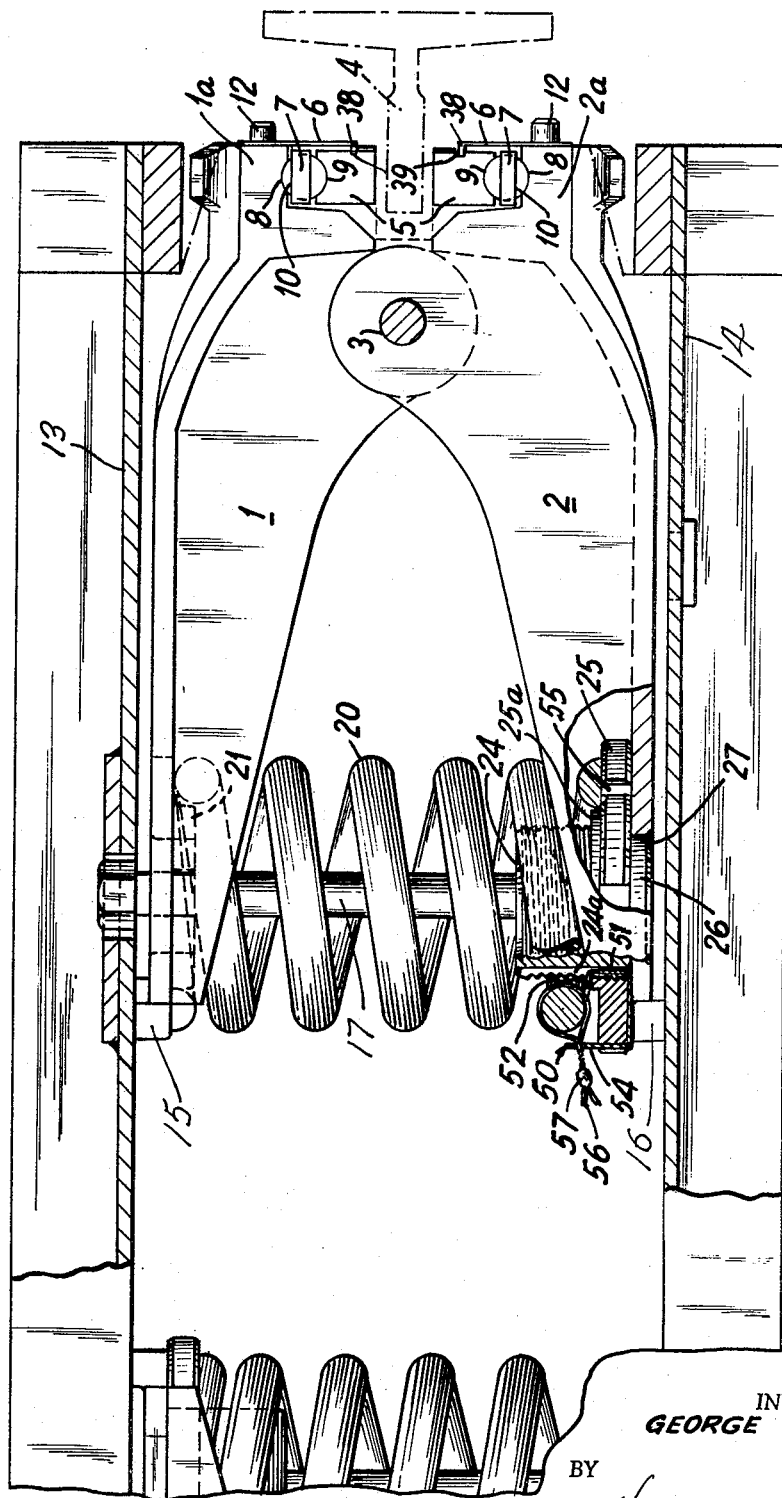
FIG. 1 is a cutaway plan view of one side of the dual clamping mechanism of the invention installed between the planks of the elevator cab.
Figure 2:
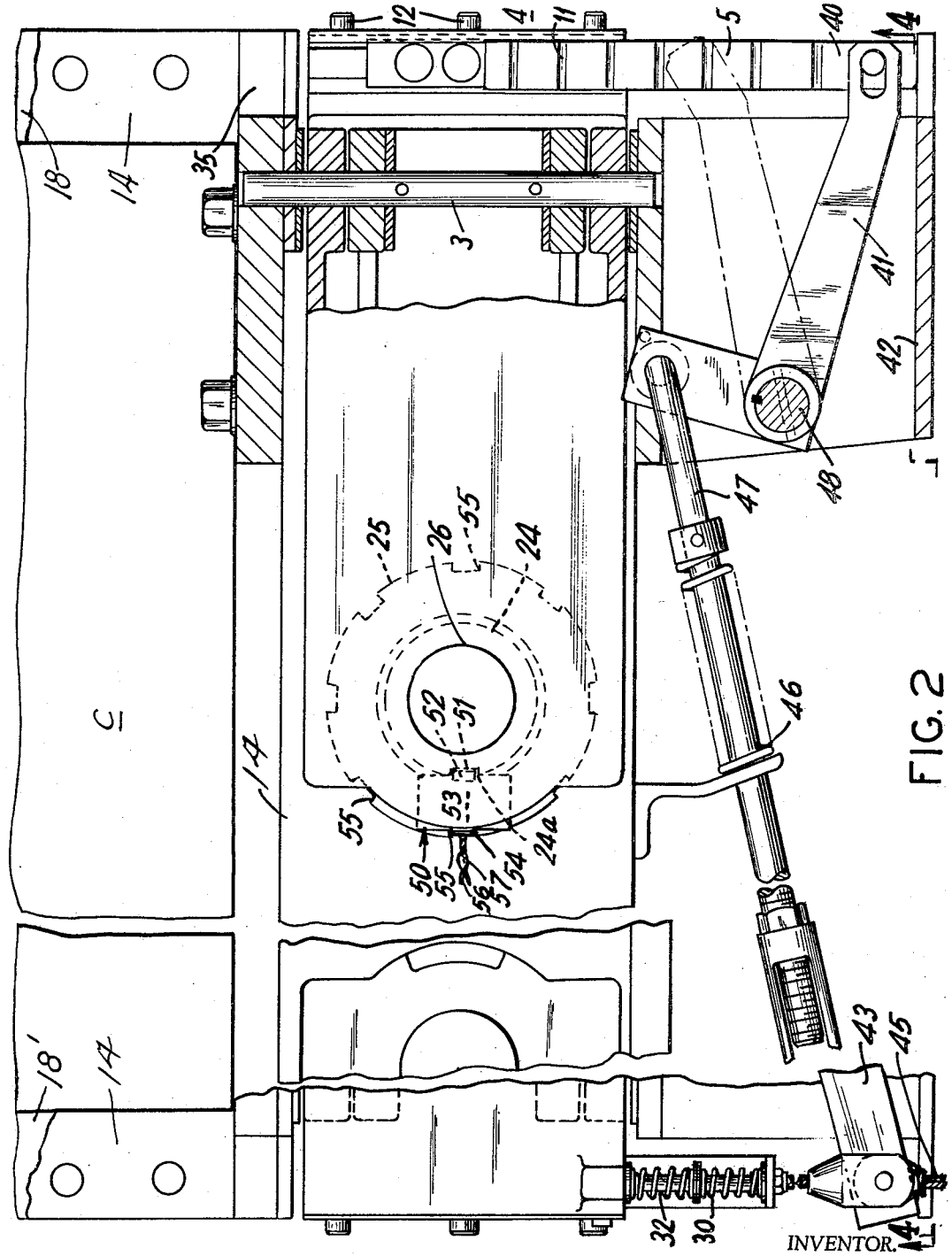
FIG. 2 is a cutaway side view of the clamping mechanism of the invention and its actuation linkage as installed on an elevator cab.

Referring now to FIGS. 1 and 2, a clamp of the invention is illustrated with levers 1 and 2 positioned between parallel safety planks 13 and 14, which safety planks are positioned across the bottom of an elevator cab C in the conventional manner. Levers 1 and 2 extend along opposing inside vertical surfaces 13a and 14a of the safety planks 13 and 14 respectively. A coil spring 20 compressed levers 1 and 2 urges the inner ends thereof against the safety planks 13 and 14. Feet 15 and 16 extending outwardly from the inner ends of levers 1 and 2 respectively abut against the inside surfaces 13a and 14a of safety planks 13 and 14. When the clamp is in its normal disengaged position, as illustrated in FIG. 1, levers 1 and 2 are retained in position relative to rail 4 by the safety planks 13 and 14.

Figure 3:
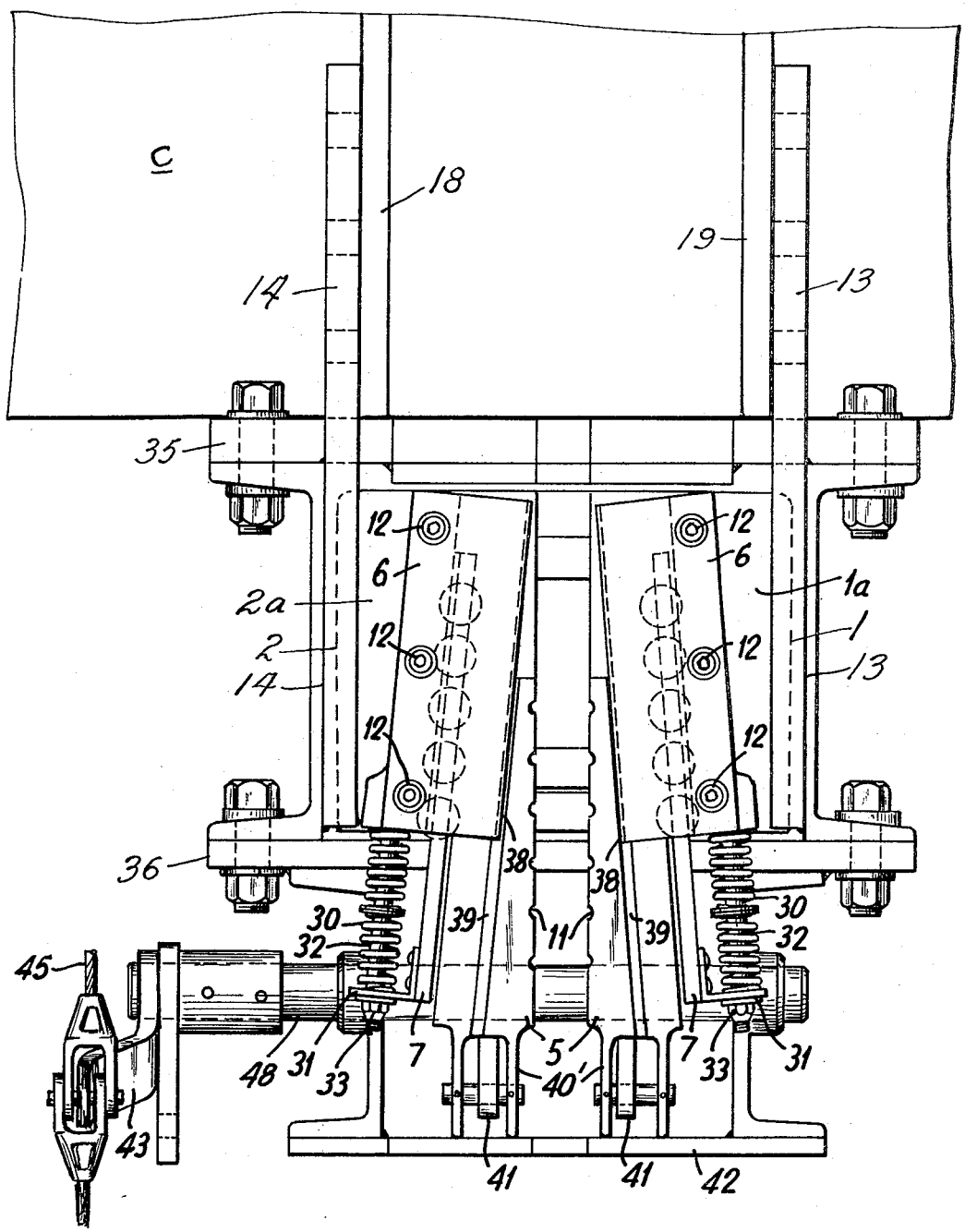
FIG. 3 is an end view of the braking assembly of the invention on an elevator cab.

The elevator cab C is supported on opposite sides by stiles 18, 18', 19, and 19' to which the safety planks 13 and 14 are bolted (see FIG. 3). The platform of the elevator C is also supported by the safety planks 13 and 14 in the conventional manner.

Levers 1 and 2 are joined at a pivot point near tne jaw of the clamp by a pivot pin 3 which passes through vertically aligned bores in each lever. The outboard opposing ends 1a and 2a of levers 1 and 2 constitute the jaws of the clamp which are seen positioned on opposite sides of rail 4. The brake shoes or gibs 5 are illustrated in the withdrawn position, riding parallel to rail 4. The gibs are held in the jaws by retainer plates 6, one of which is bolted to the outboard edge of each jaw by three retainer bolts 12. A ball bearing and guide roller 7 rides between each gib and its associated jaw. Coil spring 20 is held in position upon lever 1 by a stationary bushing 21, and in position upon lever 2 by a flange-nut-bushing combination 25–25a which threads upon a plug 24.

Plug 24 is held in precise position on lever 2 by an unthreaded cylindrical extension 26 which fits into a cooperating cylindrical recess 27 in lever 2. Plug 24 is welded in place upon lever 2.

The gibs 5 are retained in contact with guide roller 7 by the action of retainer plate 6 (see FIG. 3), and by the rolled in edge of retainer plate 6 which forms a guiding fin 38. Fin 38 rides in a groove 39 in the outside face of each gib and prevents direct lateral motion thereof. A bolt 17 passes through lever arm 1 and threads into plug 24 to compress spring 20 during installation of the clamp. Following installation of the clamp, bolt 20 is removed.

FIGS. 2 and 3 illustrate the mechanism for wedging and the gibs between jaws 1a and 2a in the rail 4. The gibs 5 terminate at their lower end in U-shape extensions numeral 40′ which are pivotally attached to and raised by a dual armed lever 41. The plate bottom stop 42 provides the lower stop and support for shoes 40 in the withdrawn position. Lever 41 is actuated on one side of the cab by arm 43, and on the other side by a lever linkage 46, 47 and 48 to govern cable 45 (see FIG. 4).

Figure 4:
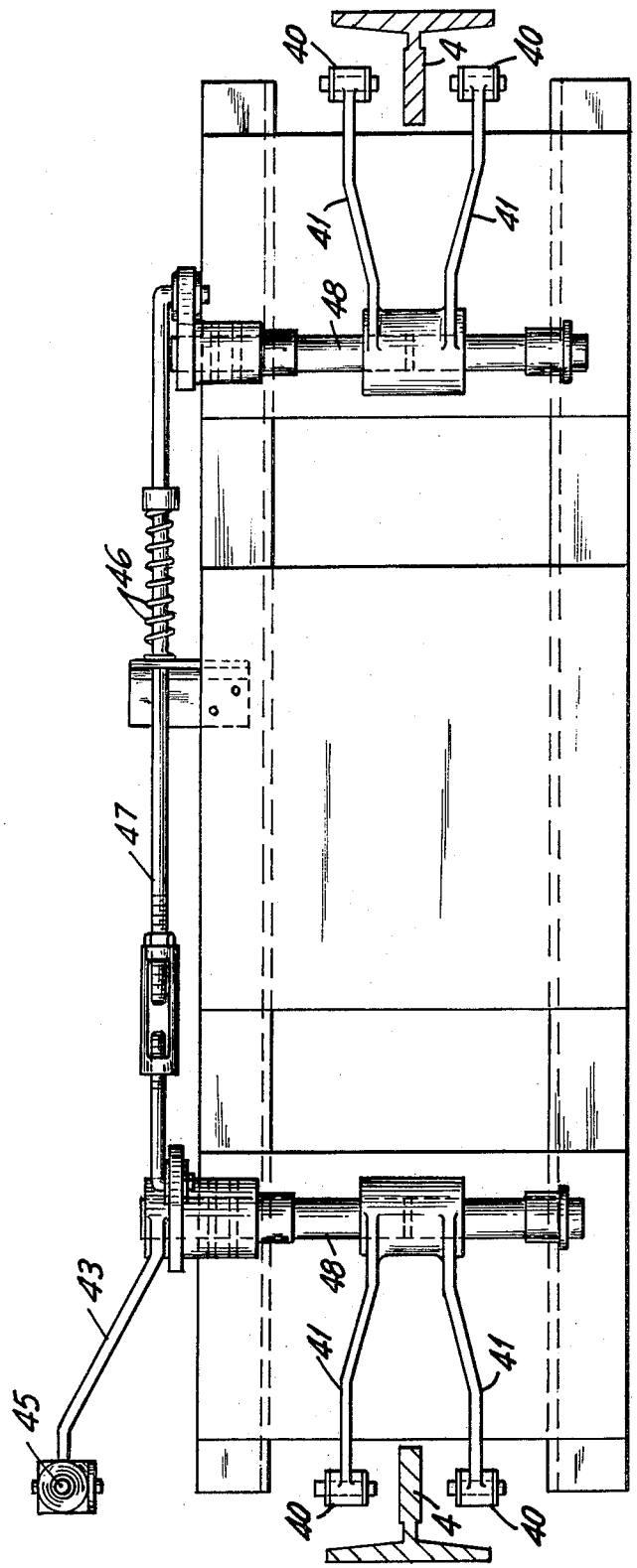
FIG. 4 is a plan view of the gib lifting assembly and the linkage connecting the companion braking mechanisms.

FIG. 4 illustrates the mechanical linkage connecting the governor cable to the lever arms 41. Upon overspeed of the elevator, governor cable 45 exerts a pull in the upward direction arm 43, whereupon the lever linkage immediately raises the gibs into braking contact with the rail.

When the brake is not in use, lever arms 41 are biased to the withdrawn position by compressed spring 46 which acts through arm 47 and shaft 48.

To release the brake, upward tension on governor cable 45 is relaxed, and the cab is lifted, spring 46 rotates lever arms 41 through the linkage to withdraw the gibs 5 from the braking position.

FIGS. 1 and 2 also illustrate the mechanism for locking compression adjusting nut 25 in position on plug 24, which prevents any inadvertent change in the compression of spring 20. A locking clip 50 rides in a keyway 24a in plug 24, and in detents 55 in nut 25. Clip 50 is basically L-shaped, with the bottom leg 51 of the L riding in keyway 24a. The end 52 of leg 51 is bent up against the inside face of nut 25, and the upright leg 53 of the L rides against the outside face of nut 25. With the nut 25 adjusted to produce the desired spring pressure, the top 54 of upright leg 53 is bent over into one of several detents 55 around the periphery of nut 25. A safety wire 56 passed through leg 53 and around spring 20 retains clip 50 in position. A seal 57 may be used as a security check upon this retention means.

Nut 25 screws onto plug 24, and constitutes a flange thereon against which spring 20 presses to exert its force upon lever 2. Nut 25 also provides a bushing 25a to keep spring 20 clear of the threads of plug 24. The compression on spring 20 is adjusted by threading nut 25 up or down on plug 24.

Referring to FIG. 3, levers 1 and 2 are enclosed between the safety planks 13 and 14, and retained there in working alignment by a pivot pin 3 which is supported at the top by a retaining plate 35 and at the bottom by a retaining plate 36. Plates 35 and 36 are bolted to the safety planks 13 and 14.

Safety planks 13 and 14 are attached to two vertical stiles 18 and 19, respectively, to which the elevator cab C is attached.

In the embodiment of the invention illustrated, each roller guide 7 is biased to the withdrawn position by a compression spring 30. Spring 30 is confined between the bottom of a jaw, and a sliding bracket 31 attached to its associated roller guide 7. The sliding bracket 31 and spring 30 are supported by shaft 32 which extends rigidly downward from its associated jaw. As the gibs are wedged up along the jaws, roller guides 7 will ride up with them carrying bracket 31 up shaft 32 and compression spring 30. When the elevator is lifted to release the brake and the gibs are withdrawn, spring 30 will withdraw the roller guide 7 to a position established by nut 33 which threads onto shaft 32 and acts as a bottom stop for sliding bracket 31. This action of spring 30 and roller guide 7 facilitates the withdrawal of the gibs.

Upon engagement of the rail 4 by the gibs 5, a series of lands 11 in the face of the gibs making contact with the rail will wipe the rail clean to improve the frictional contact therebetween.

As the gibs 5 are raised into contact with rail 4, jaws 1a and 2a will be forced apart compressing spring 20. The gibs will quickly reach their fully inserted position, which action compresses spring 20 by a known amount. Spring 20 may be adjusted to respond to this known compression with the braking force required for the particular elevator and operating conditions.

Gibs 5, when raised into contact with rail 4, are brought to rest when in contact with the top plate 35 (see FIG. 2) which is rigidly attached to the cab safety planks 13 and 14. This action transmits the braking force from the rail to the cab.

While the principles of the invention have been described in connection with the above specific apparatus, it is to be clearly understood that this description is made only by way of example and not as a limitation to the scope of the invention.

I claim:
1. A flexible clamp elevator braking mechanism mountable between the safety planks of an elevator cab to urge braking gibs against a guide rail in response to a speed sensing mechanism comprising
   two pivotally connected arms, having outer ends which comprise braking jaws to engage the opposite sides of an elevator guide rail braking gibs mounted upon the inner faces of said jaw,
   said arms being so pivotally connected that the spreading of said jaws will cause the inner ends of said arms to come together,
   spring means disposed between the inner ends of said arms and substantially perpendicular thereto to bias said inner arms apart and said jaws to a preselected position adjacent to but apart from the guide rail,
   means to retain said spring means between said arms,
   means to adjust the extent of bias provided by said spring means,
   and means to mount said pivotally connected arms together with said spring means and adjustment means between the safety planks of an elevator cab said spring means is a compression coil spring, and said means to retain said spring between said arms and said means to adjust said spring means is comprised of a stationary bushing mounted upon the inner end of one of said arms and facing the other of said arms, and a movable bushing mounted upon the inner end of the other of said arms and opposite said stationary bushing, said coil spring being retained in a compressed state between said bushings.

2. In combination, an elevator cab and a flexible safety guide clamp therefor comprising
   an elevator cab,
   two parallel safety planks attached across the bottom of said cab straddling the guide rails for said elevator cab and dual flexible guide clamps and means for mounting said clamps between said safety planks and at opposite ends thereof in position to engage said guide rails, each of said safety clamps having two lever arms the outer ends of which comprise opposite sides of a jaw to engage an associated elevator guide rail and the inner ends of which are in respective lateral abutting relationship with said safety planks when said clamp is disengaged, means to pivotally connect said lever arms so that the spreading of said jaws will cause the inner ends of said arms to come together, coil spring means compressed between the inner ends of said arms and biasing the inner ends of the two lever arms apart and into abutting contact with said safety planks, thereby positioning each side of said jaw a selected distance away from its associated guide rail, means attached to the inside of said arms to retain said spring means between said arms, and means to adjust the tension upon said spring without changing the selected distance of the jaws from the rail.

3. The device of claim 2 wherein said means to retain said spring between said arms comprises first and second opposing bushings, a first means to fixedly attach said first bushing upon the inside of one of said arms, and a second means to movably attach said second bushing to the inside of the other of said arms, said second means include a threaded plug, means to retain said threaded plug upon the other arm, a flange nut threading upon said plug, bushing means to position one end of said spring upon said flange nut clear of said plug, and means to lock said flange nut in selected positions upon said plug nut.

References Cited
UNITED STATES PATENTS

| | | | |
|---|---|---|---|
| 1,678,031 | 7/1928 | Anderson | 187—88 |
| 2,716,467 | 8/1955 | Callaway | 187—90 |
| 3,168,944 | 2/1965 | Livermont. | |
| 3,230,024 | 1/1966 | Gika | 267—1 |
| 3,273,671 | 9/1966 | Urana | 187—88 |
| 3,346,074 | 10/1967 | Borden | 187—88 |

HARVEY C. HORNSBY, Primary Examiner